US012730878B2

(12) United States Patent
Ravi

(10) Patent No.: US 12,730,878 B2
(45) Date of Patent: Sep. 8, 2026

(54) ELECTRONIC DEVICE AND METHOD FOR ENHANCING THE SECURITY OF ENTERPRISE COMPUTER SYSTEMS AGAINST SECURITY BREACHES

(71) Applicant: Vinod Ravi, Aldie, VA (US)

(72) Inventor: Vinod Ravi, Aldie, VA (US)

( * ) Notice: Subject to any disclaimer, the term of this patent is extended or adjusted under 35 U.S.C. 154(b) by 61 days.

(21) Appl. No.: 18/970,224

(22) Filed: Dec. 5, 2024

(65) Prior Publication Data

US 2026/0161767 A1 Jun. 11, 2026

(51) Int. Cl.
*G06F 21/45* (2013.01)

(52) U.S. Cl.
CPC .................................... *G06F 21/45* (2013.01)

(58) Field of Classification Search
CPC ................. G06F 21/45; G06F 21/6218; G06F 2221/2149; G06F 21/51; G06F 21/6209; H04L 63/105; H04W 12/06
See application file for complete search history.

(56) References Cited

U.S. PATENT DOCUMENTS 6,205,563 B1 3/2001 Lewis
8,798,579 B2 * 8/2014 Hickie .................. G06F 21/604 455/410
8,949,470 B2 * 2/2015 Ristock ............ G06Q 10/06311 709/249
9,396,349 B1 * 7/2016 Berfeld ............... G06F 21/6209
9,870,480 B2 * 1/2018 Faitelson ............ G06F 21/6263
10,440,023 B2 * 10/2019 Geisler ................. G06F 16/176
11,188,657 B2 * 11/2021 Jean-Louis ........... G06F 21/577
11,563,770 B2 1/2023 Mizrahi et al.
11,611,564 B2 * 3/2023 Caramico ............. H04L 67/306
11,750,558 B2 9/2023 Bartov et al.
11,979,426 B2 5/2024 Choudha et al.
12,008,546 B2 * 6/2024 Malmborg ......... G06Q 20/4016
12,095,787 B1 9/2024 Seri et al.
12,107,895 B2 * 10/2024 Crabtree ................. H04L 63/20
12,284,225 B2 * 4/2025 Ojha ....................... H04L 63/20
2011/0185431 A1 7/2011 Deraison
2013/0074188 A1 3/2013 Giakouminakis et al.
2023/0342756 A1 * 10/2023 Malmborg ........... G06Q 20/322

* cited by examiner

*Primary Examiner* — Hosuk Song
(74) *Attorney, Agent, or Firm* — The Law Office of Kevin McDermott, P.L.L.C.

(57) ABSTRACT

A method for enhancing the security of data in enterprise computer systems against security breaches is provided that includes collecting, by at least one electronic device, information about a user. The information includes at least permissions to access applications in electronic devices, permissions to access data in at least one share folder in electronic devices, permissions to access electronic devices, and permissions to access data in databases in the enterprise computer system. Moreover, the method includes comparing the collected permissions against record permissions of the user and in response to determining at least one collected permission fails to match a record permission, determining a state change has occurred. Furthermore, the method includes determining whether the non-matching permission was authorized to be assigned to the user, and in response to determining that the non-matching permission was assigned to the user, validating the state change.

15 Claims, 5 Drawing Sheets

42

| GROUP I |
| --- |
| USER 1 |
| USER 2 |
| USER 3 |
| USER 4 |

44

| GROUP 2 |
| --- |
| USER 2 |
| USER 5 |
| USER 6 |
| USER 7 |

46

| GROUP 3 |
| --- |
| USER 2 |
| USER 8 |
| USER 9 |
| USER 10 |

48

| GROUP 4 |
| --- |
| USER 2 |
| USER 11 |
| USER 12 |
| USER 13 |

50

| USER 2 RECORD PERMISSIONS | GROUPS |
|---|---|
| ACCESS APPLICATIONS | 1 |
| ACCESS DATA IN NETWORK SHARE OR SHARE FOLDER | 2 |
| ACCESS COMPUTERS | 3 |
| ACCESS DATA IN DATABASES | 4 |

| USER 2 RECORD PERMISSIONS | GROUPS |
|---|---|
| ACCESS APPLICATIONS | 1 |
| ACCESS DATA IN NETWORK SHARE OR SHARE FOLDER | 2 |
| ACCESS COMPUTERS | 3 |
| ACCESS DATA IN DATABASES | 4 |
| INSTALL AND UNINSTALL SOFTWARE | 7 |

| PRIVILEGE 56 | RISK 58 |
|---|---|
| Administrative | Very high |
| Remote Access | High |
| Normal | Low |

FIG. 10

ELECTRONIC DEVICE AND METHOD FOR ENHANCING THE SECURITY OF ENTERPRISE COMPUTER SYSTEMS AGAINST SECURITY BREACHES

BACKGROUND OF THE INVENTION

This invention relates generally to enterprise computer systems, and more particularly, to an electronic device and a method for enhancing the security of enterprise computer systems against security breaches.

Billions of commercial and non-commercial transactions are conducted via computer systems daily. Sensitive data of individuals, for example, personally identifiable information (PII), protected health information (PHI), and sensitive data of corporations is known to be obtained and retained for use by commercial and non-commercial entities.

In the realm of digital communications and computer systems, the security landscape is rapidly evolving marked by an increasing sophistication in techniques used to conduct cyberattacks against computer systems. Such sophisticated cyberattack techniques have been known to enable malicious actors to compromise enterprise computer systems. As a result, malicious actors are becoming increasingly capable of attacking and successfully breaching the security of enterprise computer systems to obtain PII, PHI, and other sensitive information to perpetuate fraud, impersonation, and other malicious activities.

Many known cybersecurity techniques are tailored to specific aspects of enterprise computer systems such as electronic devices, firewalls, databases, applications, and user identities. However, it is difficult and expensive to implement measures for these aspects to adequately protect an enterprise computer system against security breaches. As a result, identity theft and corporate espionage appear to be increasing and the related costs and inconvenience resulting from successful attacks are rapidly increasing.

Thus, it would be advantageous and an improvement over the relevant technology to provide an electronic device and a method capable of enhancing the security of enterprise computer systems against security breaches to facilitate reducing identity theft, reducing corporate espionage, and reducing the related costs and inconvenience resulting from such security breaches.

BRIEF DESCRIPTION OF THE INVENTION

In one aspect, a method for enhancing the security of enterprise computer systems against security breaches including the steps of collecting, by at least one electronic device in an enterprise computer system, information about a user. The information includes at least permissions to access applications in electronic devices in the enterprise computer system, permissions to access data in at least one share folder in electronic devices included in the enterprise computer system, permissions to access electronic devices in the enterprise computer system, and permissions to access data in databases in the enterprise computer system. The collected permissions are associated with the user.

Moreover, the method includes comparing the collected permissions against record permissions of the user, and in response to determining at least one collected permission fails to match a record permission determining a state change has occurred. Furthermore, the method includes determining whether the non-matching permission was authorized to be assigned to the user and in response to determining that the non-matching permission was assigned to the user, validating the state change.

In one embodiment, the method further includes changing the collected permissions of the user to match the record permissions of the user in response to determining the non-matching permission was not authorized to be assigned to the user.

In another embodiment of the method, the determining step includes searching items of evidence. Each item of evidence authorizes assignment of a permission. When an item of evidence is found that authorizes assignment of the non-matching permission to the user, the method determines the non-matching permission was authorized to be assigned to the user.

In yet another embodiment the determining step includes searching items of evidence. Each item of evidence authorizes assignment of a permission. When failing to find an item of evidence that authorized assignment of the non-matching permission to the user, the method determines the non-matching permission was unauthorized to be assigned to the user.

In yet another embodiment, the method further includes determining whether the non-matching permission assigned administrative or remote access privileges.

In yet another embodiment, the method further includes determining whether the user has permission to access additional electronic devices in the enterprise computer system.

In yet another embodiment, the method includes determining whether a firewall in the enterprise computer system permits electronic devices in the enterprise computer system to communicate with other electronic devices outside the enterprise computer system when the user has permission to access additional electronic devices in the enterprise computer system.

In yet another embodiment, the method further includes investigating the enterprise security system for a security breach when the firewall permits electronic devices in the enterprise computer system to communicate with other electronic devices outside the enterprise computer system, and changing the collected permissions of the user to match the record permissions of the user.

Another aspect of the present disclosure provides a non-transitory computer-readable recording medium in an electronic device. The non-transitory computer-readable recording medium stores one or more programs which when executed by the hardware processor performs the steps of the methods described above.

In another aspect, an electronic device for enhancing the security of enterprise computer systems against security breaches includes a processor and a memory configured to store data. The electronic device is associated with a network and the memory is in communication with the processor and has instructions stored thereon which, when read and executed by the processor, cause the electronic device to receive information about a user. The information includes at least permissions to access applications in electronic devices in the enterprise computer system, permissions to access data in at least one share folder in electronic devices included in the enterprise computer system, permissions to access electronic devices in the enterprise computer system, and permissions to access data in databases in the enterprise computer system. The collected permissions are associated with the user.

The instructions when read and executed by the processor, further cause the electronic device to compare the received permissions against record permissions of the user, and in response to determining at least one collected permission fails to match a record permission, determines a state change has occurred. Moreover, the instructions when read and executed by the processor, cause the electronic device to determine whether the non-matching permission was authorized to be assigned to the user, and in response to determining that the non-matching permission was assigned to the user, validate the state change.

In another embodiment, the instructions when read and executed by the processor, cause the electronic device to change the collected permissions of the user to match the record permissions of the user in response to determining the non-matching permission was not authorized to be assigned to the user.

In yet another embodiment, the instructions when read and executed by the processor, cause the electronic device to store items of evidence within the memory. Each item of evidence authorizes assignment of a permission to a record user. Moreover, the instructions when read and executed by the processor, cause the electronic device to search the items of evidence for an item of evidence that authorizes assignment of the non-matching permission to the record user, and when an item of evidence is found that authorizes assignment of the non-matching permission to the user, determine the non-matching permission was authorized to be assigned to the user.

In yet another embodiment, the instructions when read and executed by the processor, cause the electronic device to store items of evidence within the memory. Each item of evidence authorizes assignment of a permission to a record user. Moreover, the instructions when read and executed by the processor, cause the electronic device to search the items of evidence for an item of evidence that authorizes assignment of the non-matching permission to the user, and when an item of evidence is not found that authorizes assignment of the non-matching permission to the record user, determine that assignment of the non-matching permission to the user was unauthorized.

In another embodiment, the instructions when read and executed by the processor, cause the electronic device to determine whether the non-matching permission assigned administrative or remote access privileges.

In yet another embodiment, the instructions when read and executed by the processor, cause the electronic device to determine whether the user has permission to access additional electronic devices in the enterprise computer system.

In yet another embodiment, the instructions when read and executed by the processor, cause the electronic device to determine whether a firewall in the enterprise computer system permits electronic devices in the enterprise computer system to communicate with other electronic devices outside the enterprise computer system when the user has permission to access additional electronic devices in the enterprise computer system.

In yet another embodiment, when the firewall permits electronic devices in the enterprise computer system to communicate with other electronic devices outside the enterprise computer system, the instructions when read and executed by the electronic device, cause the processor to change the received permissions of the user to match the record permissions of the user, and an entity responsible for managing permissions in the enterprise computer system investigates the system for a security breach.

BRIEF DESCRIPTION OF THE DRAWINGS

FIG. 8 is a diagram illustrating a table including example record permissions assigned to a user and corresponding groups to witch the user belongs;

FIG. 9 is a diagram illustrating a table including example permissions collected for a user and corresponding groups to which the user belongs;

FIG. 10 is a diagram illustrating a table including example privileges and corresponding example risks.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
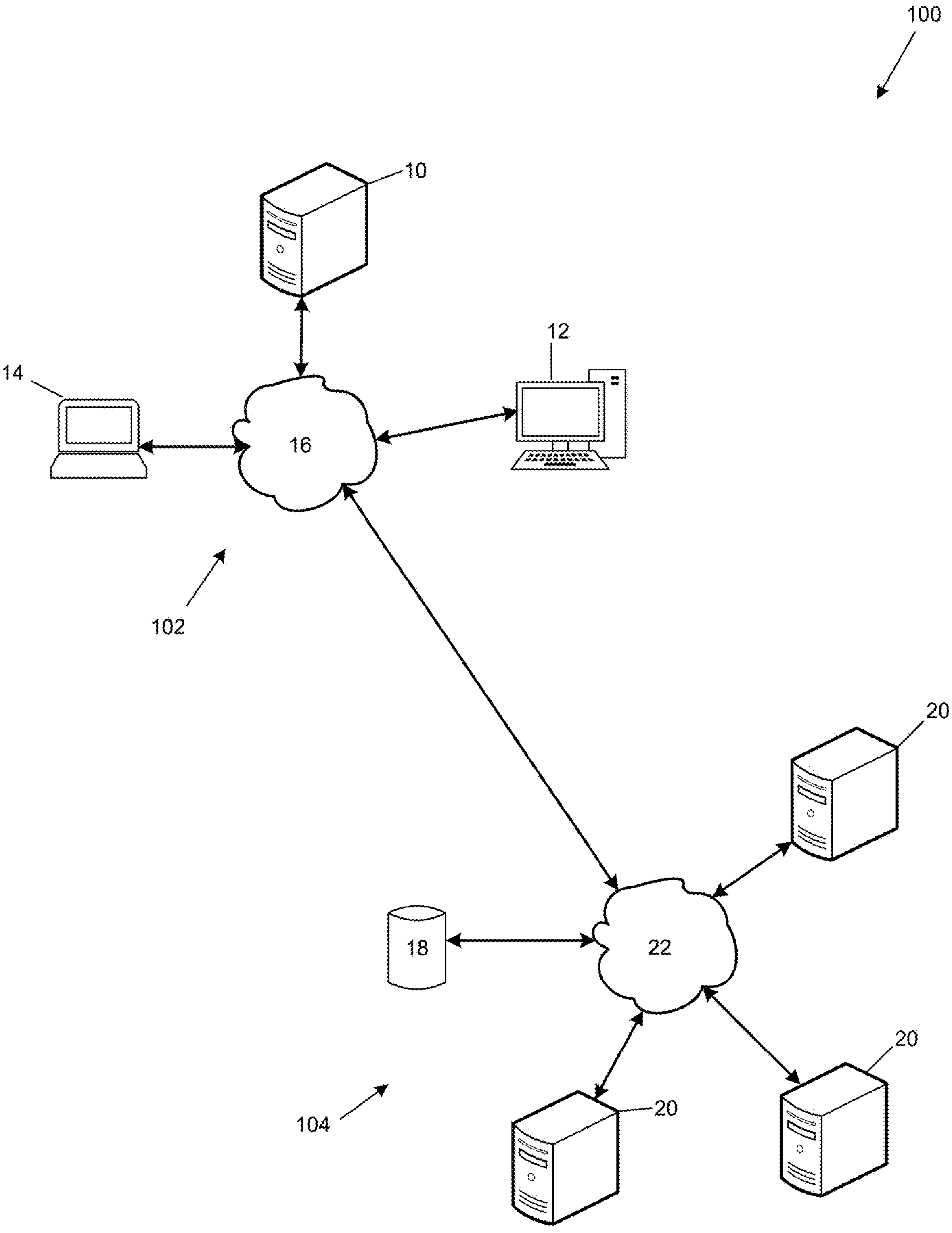
FIG. 1 is a schematic diagram of an example enterprise computer system for enhancing the security of enterprise computer systems against security breaches according to an embodiment of the present disclosure.

FIG. 1 is a schematic diagram of an example enterprise computer (EC) system 100 for enhancing the security of EC systems against security breaches according to an embodiment of the present disclosure. As shown in FIG. 1, the main elements of the EC system 100 include an electronic device 10, a personal computer (PC) 12, and a laptop computer 14 which are communicatively connected via a network 16. The electronic device 10, PC 12, and laptop computer 14, communicatively connected via the network 16 may be considered a first computer subsystem 102. The main elements of the system 100 also include a database 18 and three computers 20 each implemented as a network server or network computer that are communicatively connected via a network 22. The database 18 and three computers 20 communicatively connected via the network 22 may be considered a second computer subsystem 104. The networks 16 and 22 are communicatively connected.

Although the EC system 100 is described as including two communicatively connected computer subsystems 102 and 104, it is contemplated by the present disclosure that the EC system 100 may alternatively include any number of communicatively connected computer subsystems. It is contemplated by the present disclosure that the number of electronic devices 10, PCs 12, laptop computers 14, databases 18, and computers 20 is not limited to the number shown in the EC system 100. Rather, any number of electronic devices 10, PCs 12, laptop computers 14, databases 18, and computers 20 may be included in the EC system 100.

In FIG. 1, the electronic device 10 can be any electronic device capable of at least downloading applications over the Internet, running applications, collecting permissions and privileges, storing data temporarily and/or permanently, and otherwise performing any and all functions, methods and/or algorithms described herein by any computer, computer system, server or electronic device included in the system 100. For example, the electronic device 10 may be any type of server or computer implemented as a network server or network computer. Other examples of the electronic device 10 include, but are not limited to, a laptop computer and a PC.

As described herein a user may be a person, an application, or a service account that logs into, for example, a website application or any other type of application to perform an action. For example, a service account, application or person operating the PC 12 may log into a bank website to transfer funds. As another example, a service account or application may log into the computer of a company to obtain time sheets for use in preparing payroll. The application may be run by any electronic device, computer or personal computer in the system 100. A service account is a non-human account used by applications to access resources in, for example, the EC system 100 or perform actions without the owner of the account.

The computers 20 can be, for example, any type of server or computer implemented as a network server or network computer. The electronic device 10, PC 12, laptop computer 14, and computers 20 may each alternatively be referred to as an information system. Additionally, the PC 12, laptop computer 14, and computers 20 may each alternatively be referred to as an electronic device.

The networks 16, 22 may each be implemented as a 5G communications network. Alternatively, the networks 16, 22 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The networks 16, 22 may also be any type of wired network or a combination of wired and wireless networks. The networks 16, 22 also typically include routers (not shown) and firewalls (not shown).

Figure 2:
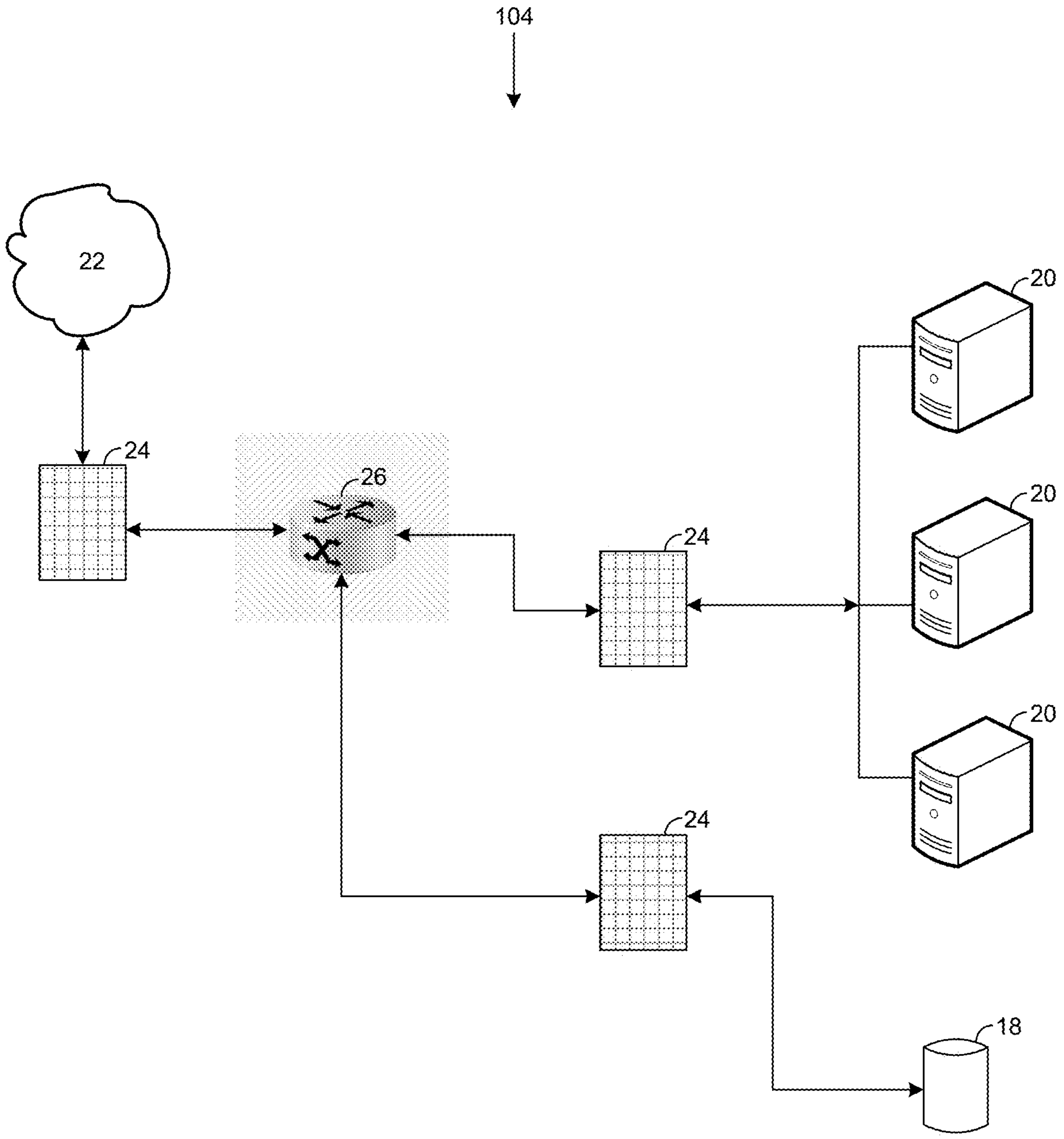
FIG. 2 is a schematic diagram illustrating an example computer subsystem included in the example enterprise computer system shown in FIG. 1.

FIG. 2 is a schematic diagram illustrating the second example computer subsystem 104 from the enterprise computing system 100 shown in FIG. 1, further including firewalls 24 and a router 26. Firewalls 24 are often used to ensure that unauthorized users cannot communicate with electronic devices in computer systems, for example, the data base 18 and computers 20 in the second example computer subsystem 104. Unauthorized users attempting to access electronic devices in, for example, the computer subsystem 104 from outside the subsystem 104 are referred to herein as external users. External users may attempt to access the second computer subsystem 104, for example, via the Internet.

Firewalls generally implement policies to prevent unauthorized access into or out of a computer system, for example, the second computer subsystem 104. In an example that requires permission to gain access into the second computer subsystem 104, a policy may require that communications include a code to pass through the firewall 24 to access the computers 20 and/or the database 18 via the network 22. The communications of users who have permission to access the computers 20 and the database 18 include the required code. Thus, communications of users having the required permissions pass through the firewalls 24 and allow the user to access the data and applications available on the computers 20 and database 18. Thus, communications of users that pass through firewalls 24 can be externally connected to, for example, the second computer subsystem 104 which is protected by the firewalls 24.

The firewalls 24 also control communications out of the enterprise computer system. More specifically, the firewalls 24 may permit electronic devices in the enterprise computer system 100, for example, any of the computers 20 to communicate with other electronic devices outside the enterprise computer system 100 via the firewalls 24 when the electronic device has one or more certain permissions, for example, the permission to access additional electronic devices in the enterprise computer system 100. It is contemplated by the present disclosure that firewalls 24 may alternatively not permit electronic devices from outside the EC system 100 to communicate with, for example, the second computer subsystem 104. Firewalls 24 may also not permit electronic devices in the enterprise computer system 100, for example, any of the computers 20 to communicate with other electronic devices outside the enterprise computer system 100.

Permissions as described herein are the authorizations given to users to enable accessing specific resources on a computer system, for example, the EC system 100. Example permissions include, but are not limited to, permission to access applications on electronic devices and computers, permission to access a share folder in an electronic device or computer, permission to access electronic devices and computers, and permission to access data on an electronic device or computer. User permissions may also determine whether a user is allowed to read data only, read as well as edit data, install software, and uninstall software. Example resources include, but are not limited to, data files, electronic devices, applications, printers and scanners.

Privileges as described herein refer to the authority of a user to perform system-level actions, for example, turning off a computer, starting a computer, or changing system settings. System administrators typically have many privileges. Users may have both permissions and privileges. It is contemplated by the present disclosure that electronic devices, computers, and servers included in the EC system 100 may also have permissions and privileges. Such permissions may include authorizations that permit communications between devices in, for example, the first 102 and second 104 computer subsystems to pass through respective firewalls to access the electronic devices in the respective computer subsystems. For example, the electronic device 10 may have permission to communicate with the database 18 and servers 20 over the network 22 via the firewalls 24.

Figures 3, 4, 5, 6, 7:
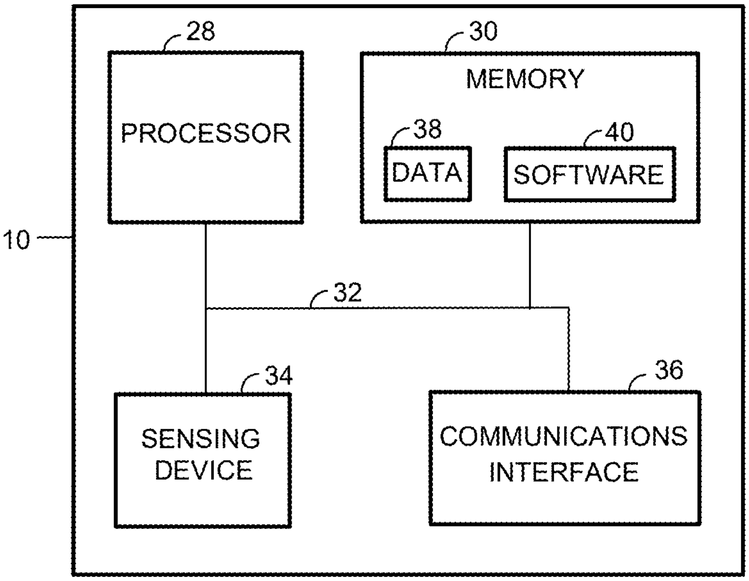
FIG. 3 is a more detailed schematic diagram illustrating an example electronic device in the enterprise computer system of FIG. 1 for enhancing the security of enterprise computer systems against security breaches according to an embodiment of the present disclosure.
FIG. 4 is a diagram illustrating a table for a first example group of users.
FIG. 5 is a diagram illustrating a table for a second example group of users.
FIG. 6 is a diagram illustrating a table for a third example group of users.
FIG. 7 is a diagram illustrating a table for fourth example group of users.

FIG. 3 is a more detailed schematic diagram illustrating the example electronic device 10 used for enhancing the security of EC systems against security breaches according to an embodiment of the present disclosure. The electronic device 10 includes components such as, but not limited to, one or more processors 28, a memory 30, a bus 32, a sensing device 34 and a communications interface 36. General communication between the components in the electronic device 10 is provided via the bus 32.

In FIG. 3, the electronic device 10 can be any electronic device capable of at least downloading applications over the Internet, running applications, capturing and storing data temporarily and/or permanently, and otherwise performing any and all functions, methods and/or algorithms described herein as being performed by any computer, computer system, server or electronic device capable of communicating with the electronic device 10. For example, the electronic device 10 may be any type of server or computer implemented as a network server or network computer. Other examples of the electronic device 10 include, but are not limited to, a laptop computer and a PC.

The processor 28 executes instructions, or computer programs, stored in the memory 30. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 30 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read. The memory 30 may be provided by a cloud-based service.

The memory 30 may be used to store any type of data 38, for example, data records of users. Each data record is typically for one user. The data record for each user may include data such as, but not limited to, permissions of the user, privileges of the user, groups to which the user belongs, and if applicable personal data of the user. The memory 30 may also store data regarding groups of users, firewall policies, and items of evidence indicating that the user was authorized to be assigned permissions. The user permissions and/or privileges stored in the electronic device 10 may be referred to as record permissions and/or record privileges.

Generally, an item of evidence is created when a permission and/or privilege is authorized to be assigned to a user. The item of evidence indicates that a particular user was authorized to be assigned a certain permission and/or privilege. Example items of evidence include, but are not limited to, tickets. The items of evidence can be searched automatically to determine whether a user was authorized to be assigned a permission and/or privilege. Alternatively, the items of evidence can be manually searched. Most users are assigned a plurality of permissions and/or privileges.

Although the permissions and privileges are described herein as being stored in the electronic device 10, it is contemplated by the present disclosure that the permissions and privileges may alternatively be stored in any electronic device in the system 100 or in an electronic device outside the system 100.

The term "personal data" as used herein includes any demographic information regarding a person as well as contact information pertinent to the person. Such demographic information includes, but is not limited to, a person's name, age, date of birth, social security number, street address, email address, citizenship, marital status, and contact information. Contact information can include devices and methods for contacting the person.

Additionally, the memory 30 can be used to store any type of software 40. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, applications that collect user permissions in a network, applications that determine whether a collected permission was authorized, and any special computer program that manages the relationship between application software and any suitable variety of hardware that helps to make-up a computer system or computing environment. The software may also include computer programs that implement buffers and use RAM to store temporary data.

An Active Directory (AD) is an application that manages user access to network resources, such as computers, user accounts, Network Shares, Share Folders and databases within the EC system 100. A Network Share is a resource that is stored on an electronic device in a computer system, for example, the EC system 100 that may be accessed by users. A Share Folder is a folder stored on an electronic device in a computer system, for example, the EC system 100 that can be shared amongst different users. Data accessible via a Network Share or a Share Folder is in a file format. For example, the data may be word processing files or text files.

Generally, each application in the EC system 100 is associated with a database. As a result, there are many different databases in the EC system 100. Data in databases is in a tabular format. The data in databases may be accessed by users having permission to access the databases. The data in the databases may be, for example, updated, modified, or removed by modifying a line in the database. Each database in the EC system 100 may be updated by a user having permission to update or make other changes to the respective database.

It is contemplated by the present disclosure that a Network Share or Share Folder may be implemented and stored in the memory 30. Any type of data 38 for access by authorized users may be accessed via the Network Share or the Share Folder.

The sensing device 34 may include Radio Frequency Identification (RFID) components or systems for receiving information from other electronic devices. The sensing device 34 may alternatively, or additionally, include components with Bluetooth, Near Field Communication (NFC), infrared, or other similar capabilities. The electronic device 10 may alternatively not include the sensing device 34.

The communications interface 36 provides the electronic device 10 with two-way data communications. Moreover, the communications interface 36 enables the electronic device 10 to wirelessly access the Internet over the network 16, 22. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethemet™ or an Asynchronous Transfer Model (ATM) network) to provide a data communication connection to a compatible LAN. As yet another example, the communications interface 48 may be a wire or a cable connecting the electronic device 10 with a LAN, or with accessories such as, but not limited to, biometric modality data capture devices. Further, the communications interface 36 may include peripheral interface devices, such as a Universal Serial Bus (USB) interface, a PCMCIA (Personal Computer Memory Card International Association) interface, and the like. Thus, it should be understood the communications interface 36 may enable the electronic device 10 to conduct any type of wireless or wired communications such as, but not limited to, accessing the Internet. Although the electronic device 10 includes a single communications interface 36, the electronic device 10 may alternatively include multiple communications interfaces 36.

The communications interface 36 also allows the exchange of information across the networks 16, 22. The exchange of information may involve the transmission of radio frequency (RF) signals through an antenna (not shown). Moreover, the exchange of information may be between the electronic device 10 and any other computer systems (not shown) and any other electronic devices (not shown) capable of communicating over the networks 16, 22. The computer systems (not shown) and the electronic devices (not shown) typically include components similar to the components included in the electronic device 10.

The networks 16, 22 may each be a 5G communications network. Alternatively, the networks 16, 22 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The networks 16, 22 may also be any type of wired network or a combination of wired and wireless networks.

Examples of other computer systems (not shown) include computer systems of service providers such as, but not limited to, financial institutions, medical facilities, governmental agencies, merchants, and third parties who provide services to commercial entity operations. Examples of other electronic devices (not shown) include, but are not limited to, laptop computers and personal computers. The other electronic devices (not shown) may be associated with any individual or with any type of entity including, but not limited to, commercial and non-commercial entities. The electronic devices may alternatively be referred to as computers or information systems, while the computers (not shown) may alternatively be referred to as electronic devices or information systems.

Users who are assigned a same permission may be organized into groups, where each different group corresponds to a different permission.

FIG. 4 is a diagram illustrating a table 42 for a first example group of users having permission to, for example, access applications on the computers 20. The first group is designated as group one. User one, user two, user three and user four are each assigned the permission to access applications in the computers 20. Hence, users one to four are included in the first group and the table 42.

FIG. 5 is a diagram illustrating a table 44 for a second example group of users having permission to, for example, access data documents stored in a Network Share or Share Folder created and implemented on a computer 20. The second group is designated as group two. User two, user five, user six, and user seven are each assigned the permission to access data documents stored in the Network Share or the Share Folder created and implemented on the computer 20. Hence, users two, five, six, and seven are included in the second group and the table 44.

FIG. 6 is a diagram illustrating a table 46 for a third example group of users having permission to, for example, access the computers 20. The third group is designated as group three. User two, user eight, user nine, and user ten are each assigned the permission to access computers 20. Hence, users two, eight, nine and ten are included in the third group and in the table 46.

FIG. 7 is a diagram illustrating a table 48 for a fourth example group of users having permission to, for example, access data in any database in the EC system 100. The fourth group is designated as group four. User two, user eleven, user twelve, and user thirteen are each assigned the permission to access the data in the laptop computer 14. Hence, users two, eleven, twelve and thirteen are included in the fourth group and in the table 48.

Generally, users are assigned a plurality of permissions and/or privileges. The groups described herein each include four users. Alternatively, each different group may include any number of users, for example, more than four or less than four. Although four groups are described herein, there may alternatively be any number of groups, for example, more than four or less than four. The number of groups may be the same as the number of permissions that may be assigned to users.

Some users may not be assigned permissions. Thus, a group may be created that includes only users who have not been assigned permissions.

FIG. 8 is a diagram illustrating a table 50 including four example permissions assigned to user two and the corresponding groups to which user two belongs. User two is assigned the permission to access applications on the computers 20, the permission to access data documents in a Network Share or Share Folder created and implemented on a computer 20, the permission to access computers 20, and the permission to access data in any database in the EC system 100. Thus, the permission to access applications on the computers 20 corresponds to group one, the permission to access data documents in a Network Share or Share Folder created and implemented on a computer 20 corresponds to group two, the permission to access computers 20 corresponds to group 3, and the permission to access data in any database in the EC system 100 corresponds to group four.

The permissions assigned to user two and the groups to which user two belongs may be stored in, for example, the electronic device 10. The permissions and groups stored in the electronic device 10 may be referred to herein as record permissions and record groups. Information for groups one to four may be stored in the various electronic devices in the EC system 100, for example, the laptop computer 14 and the PC 12.

Data collection software may operate on any electronic devices in the EC system 100 including, but not limited to, the electronic device 10, the laptop computer 14 and the PC 12. The data collection software collects information about each user including, but not limited to, permissions assigned to each user.

FIG. 9 is a diagram illustrating a table 52 including five collected permissions for user two. The permissions for user two listed in table 52 include the same permissions shown in the table 50 further including an additional permission. The additional permission is for installing and uninstalling software in electronic devices in the EC system 100. The additional permission corresponds to group seven. The data collection software collected information about user two that indicated user two was assigned the permission to install and uninstall software on electronic devices in the EC system 100. Thus, the additional permission and corresponding group seven were included in the collected information for user two. It is contemplated by the present disclosure that the electronic device 10 may constantly collect permissions from electronic devices in the EC system 100 to determine if an additional permission has been assigned to a user. Additionally, or alternatively, the electronic device 10 may constantly check to determine if the user has been added to a group not included in the record groups of the user.

Although the electronic device 10 is described herein as constantly checking for additional permissions assigned to a user and constantly checking to determine whether the user has been included in an additional group, it is contemplated by the present disclosure that the electronic device 10 may check for additional permissions and whether the user has been included in an additional group anytime, for example, hourly, daily, weekly, monthly, or on demand.

The permissions and privileges for each user as well as the groups to which each user belongs may be stored in the electronic device 10. Alternatively, or additionally, the permissions and privileges for each user as well as the groups to which each user belongs may be stored in any electronic device in the EC system 100.

A state change occurs when there is a difference between the collected and record permissions of a user. Because user two has four record permissions, not five, the collected additional permission constitutes a state change. Alternatively, or additionally, adding an additional group permission to the permissions for a user can indicate a state change. A state change may also occur, for example, when the number of collected and record permissions match, but at least one of the collected permissions does not match a record permission.

The state change may have been authorized by an entity responsible for managing permissions in the EC system 100. However, if the state change was not authorized the state change may be the result of a cyberattack. Such a cyberattack might result in a security breach of the EC system 100 in which data stored therein is stolen or the system 100 is otherwise compromised.

If an electronic device has exploitable vulnerabilities, the vulnerabilities may allow cyber attackers to gain access to additional electronic devices in the EC system 100 to obtain sensitive and confidential information which is a security breach. Thus, an unauthorized state change may enable cyber attackers to exploit vulnerabilities in the EC system 100 to gain access to other electronic devices within the EC system 100, laterally move to other electronic devices in the EC system 100 and make external connections, and steal enterprise sensitive and confidential data, which are security breaches.

When a state change is discovered, the entity responsible for managing permissions in the EC system 100 is contacted to confirm the permission was authorized to be assigned to a respective user. The entity responsible for managing permissions may be contacted, for example, via an email message or text message. If the managing entity confirms that the permission was authorized to be assigned to the user, the permission is added to the record permissions of the user. However, if the managing entity did not authorize the assignment, the state change may be the result of a cyberattack. Thus, the collected permissions are changed to agree with the record permissions of the user. For example, if the additional permission for user two was not authorized, the additional permission would be removed from the collected permissions. The collected permissions can be changed immediately in real time or can be changed at a later time.

Privileges may be granted to individual users and to groups. Users that are members of a group can indirectly take advantage of the privileges granted to the group. Privileges are granted to users in a manner designed to protect the EC system 100 from potential risks. However, such granted privileges pose risks that security of the EC system 100 could be breached should a cyber attacker obtain certain privileges.

FIG. 10 is a diagram illustrating a table 54 including example privileges 56 and corresponding example risks 58. The privileges 56 include administrative privileges, remote access privileges, and normal privileges. The corresponding risks are very high, high, and low.

Administrative privileges grant users the ability to perform system-level actions in the EC system 100, for example, change security settings, install and uninstall software and hardware, access all files on the EC system 100, and make changes to user accounts. Users holding administrative privileges are responsible for the safety and integrity of the EC system 100 and all the data that can be accessed from the system 100. Administrative privileges allow, foe example, access to all of the data and applications in the EC system 100. Thus, administrative permissions are extensive.

Because administrator privileges are extensive, the risk that the EC system 100 will experience a security breach if the administrative privileges are obtained by a cyber attacker is very high. Thus, administrative privileges are associated with a very high level of risk.

Remote access is the ability of users to access an electronic device or a computer system, for example, the computer subsystem 104 from any location, for example, via the Internet. Remote access permits users to access and manage all the files and data available on the EC system 100. However, remote access privileges do not include administrative privileges, for example, installing and uninstalling software on electronic devices in the EC system 100.

Granting permission to access, for example, the computer subsystem 104 potentially enhances the likelihood that the entire EC system 100 could experience a security breach. However, because remote access does not include administrative privileges the risk of a security breach is lower if the remote access privileges are obtained by a cyber attacker. Thus, remote access privileges are associated with a high level of risk.

Normal privileges grant users the ability to, for example, access the contents of a file, change contents of a file, transfer ownership of a file and remove a file. As a result, users with normal privileges present a low risk to the EC system 100.

Although the table 66 includes three types of privileges, it is contemplated by the present disclosure that the table 66 may include any number of different types of privileges. For example, the table 66 may include more than three types of privileges or less than three types of privileges.

Billions of commercial and non-commercial transactions are conducted via computer networks daily. Sensitive data of individuals, for example, personally identifiable information and sensitive data of corporations is known to be obtained and retained for use by commercial and non-commercial entities.

In the realm of digital communications and computer systems, the security landscape is rapidly evolving marked by an increased sophistication in techniques used to conduct cyberattacks against networks. Such sophisticated cyberattack techniques have been known to enable malicious actors to compromise EC systems. As a result, malicious actors are becoming increasingly capable of attacking and successfully breaching the security of EC systems to obtain personally identifiable information and other sensitive information to perpetuate fraud, impersonation, and other malicious activities.

Many known cybersecurity techniques are tailored to specific aspects of enterprise computer systems such as electronic devices, firewalls, databases, applications and user identities. However, it is difficult and expensive to implement measures for all of these aspects to adequately protect an enterprise computer system against successful cyberattacks. As a result, identity theft and corporate espionage appear to be increasing and the related costs and inconvenience resulting from successful attacks are rapidly increasing.

To address these problems, information about a user may be collected by at least one electronic device in the EC system 100. The information may include at least permissions to access applications in electronic devices in the EC system 100, permissions to access data in Share Folders on electronic devices in the EC system 100, permissions to access electronic devices in the EC system 100, and permissions to access data in databases in the EC system 100.

The collected permissions are associated with the user. The collected permissions may be compared against the record permissions of the user. In response to determining at least one collected permission fails to match a record permission, the electronic device 10 can determine a state change has occurred and determine whether the non-matching permission was assigned to the user. In response to determining that the non-matching permission was assigned to the user, the electronic device 10 can validate the state change.

Figure 11:
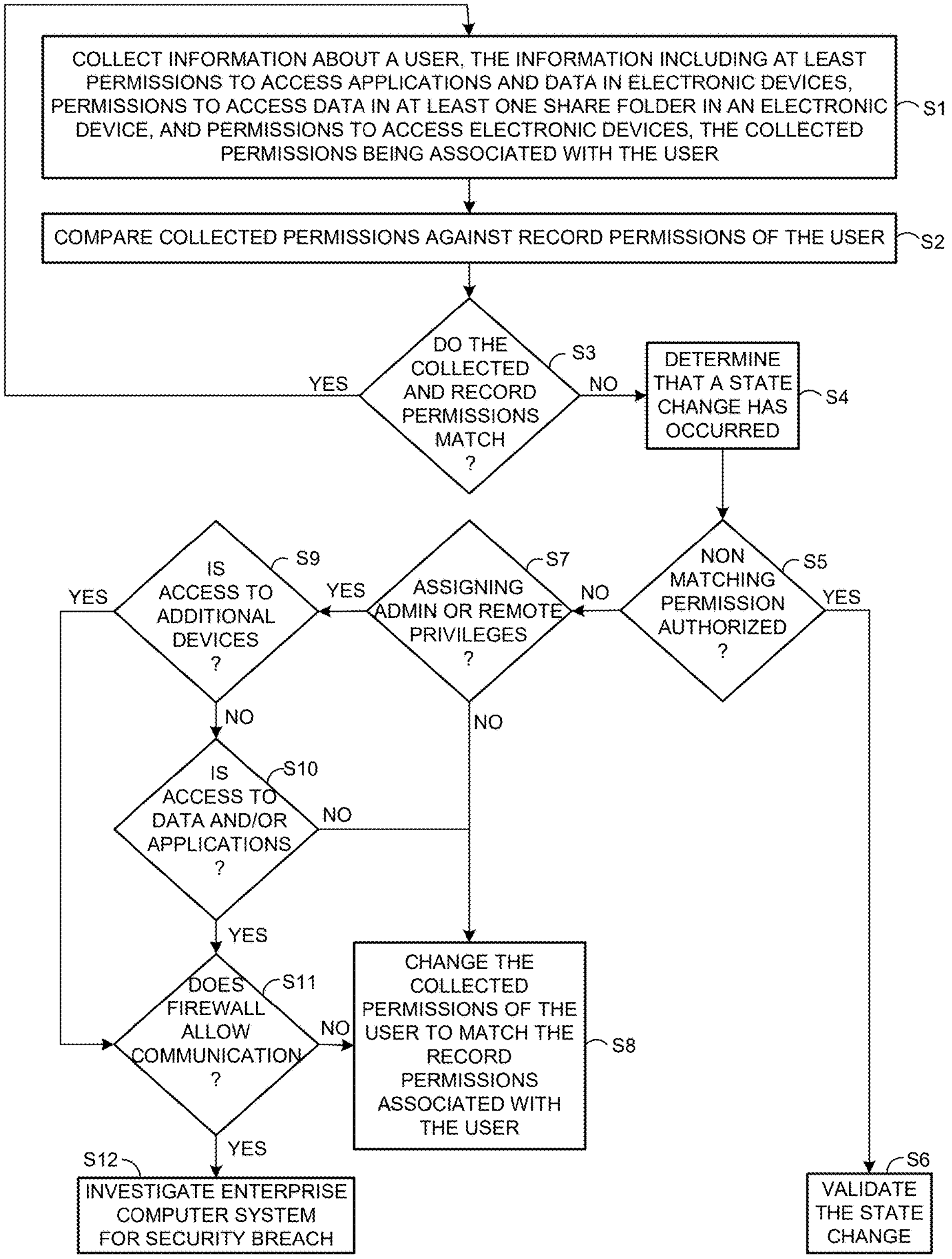
FIG. 11 is a flowchart illustrating an example method and algorithm for enhancing the security of enterprise computer systems against security breaches according to an embodiment of the present disclosure.

FIG. 11 is a flowchart illustrating an example method and algorithm for enhancing the security of enterprise computer systems against security breaches according to an embodiment of the present disclosure. FIG. 11 illustrates example steps performed when the electronic device 10 runs software 40 stored in the memory 30 to enhance the security of enterprise computer systems.

In step S1, the software 40 executed by the processor 28 causes the electronic device 10 to collect information about a user. The information includes at least permissions to access applications in electronic devices in the EC system 100, permissions to access data in at least one Share Folder in electronic devices in the EC system 100, permissions to access data stored in electronic devices in the EC system 100, and permissions to access electronic devices in the EC system 100. The collected permissions are associated with the user. The information regarding permissions may be collected periodically, for example, every twenty-four (24) hours. It is contemplated by the present disclosure that the information regarding the permissions may alternatively, or additionally, be collected, for example, on demand or continuously.

Next, in step S2, the software 40 executed by the processor 28 causes the electronic device 10 to compare the collected permissions against record permissions of the user. In step S3, the electronic device 10 determines whether each of the collected permissions matches a corresponding record permission of the user. When all the collected permissions match a corresponding record permission of the user, in step S1, the software 40 executed by the processor 28 causes the electronic device 10 to continue collecting information about the user. However, when at least one of the collected permissions fails to match a record permission, in step S4, the software 40 executed by the processor 28 causes the electronic device 10 to determine that a state change has occurred.

Next, in step S5, the software 40 executed by the processor 28 causes the electronic device 10 to determine whether the non-matching permission was authorized to be assigned to the user. The electronic device 10 may, for example, search items of evidence stored therein for an item of evidence indicating that the non-matching permission was authorized to be assigned to the user. Alternatively, the items of evidences may be manually searched. The items of evidence may be, for example, tickets.

If an item of evidence indicates that the non-matching permission was authorized to be assigned to the user, in step S6, the software 40 executed by the processor 28 causes the electronic device 10 to add the non-matching permission to the record permissions stored therein for the user. Thus, the non-matching permission is stored in the electronic device 10. Storing the non-matching permission in the electronic device 10 validates the state change. That is, the non-matching permission is validated as an authorized permission assigned to the user. Although the collected permissions and the non-matching permission are described herein as being stored in the electronic device 10, it is contemplated by the present disclosure that the collected permissions and non-matching permission may additionally, or alternatively, be stored in any electronic device in the EC system 100 capable of communicating with the electronic device 10 via the networks 16 and 22.

However, when the non-matching permission was not authorized to be assigned to the user, in step S7, the software 40 executed by the processor 28 causes the electronic device 10 to determine whether the user has administrative permissions or remote access privileges. If the user does not have administrative or remote privileges, in step S8, the software 40 executed by the processor 28 causes the electronic device 10 to change the collected permissions of the user to match the record permissions of the user.

When the user has administrative permissions or remote access privileges, in step S9, the software 40 executed by the processor 28 causes the electronic device 10 to determine whether the non-matching permission is for accessing additional electronic devices in the EC system 100. If not, in step S10, the software 40 executed by the processor 28 causes the electronic device 10 to determine whether the non-matching permission is for accessing data and/or applications in other electronic devices in the EC system 100. If not, in step S8, the software 40 executed by the processor 28 causes the electronic device 10 to change the collected permissions of the user to match the record permissions of the user.

However, if the non-matching permission is for accessing additional electronic devices in the EC system 100, in step S11, the software 40 executed by the processor 28 causes the electronic device 10 to determine whether the firewalls 24 permit electronic devices in the EC system 100 to communicate with electronic devices (not shown) not in, or outside, the EC system 100 through the firewalls 24. For example, determining whether any of the computers 20 is permitted to communicate with other electronic devices (not shown) outside the EC system 100 through the firewalls 24. If the firewalls 24 permit electronic devices in the EC system 100 to communicate with other electronic devices (not shown) outside the EC system 100, in step S12, the software 40 executed by the processor 28 causes the electronic device 10 to transmit a message to the entity that manages permissions of the EC system 100 indicating that the EC system 100 should be investigated for a security breach. In response, the managing entity investigates the EC system 100 for a security breach.

However, when the firewalls 24 do not permit electronic devices in the EC system 100 to communicate with other electronic devices (not shown) outside the EC system 100, the software 40 executed by the processor 28 cause the electronic device 10 to change the collected permissions of the user to match the record permissions of the user.

At step S10, if the non-matching permission is for accessing data and/or applications in other electronic devices in the EC system 100, in step S11, the software 40 executed by the processor 28 causes the electronic device 10 to determine whether the firewalls 24 permit electronic devices in the EC system 100 to communicate with electronic devices (not shown) outside the EC system 100 through the firewalls 24. For example, determining whether any of the computers 20 is permitted to communicate with other electronic devices (not shown) outside the EC system 100 through the firewalls 24. When the firewalls 24 do not allow electronic devices in the EC system 100 to communicate with electronic devices (not shown) not in the EC system 100, in step S8, the software 40 executed by the processor 28 causes the electronic device 10 to change the collected permissions of the user to match the record permissions of the user The method and algorithm for enhancing the security of data in an EC system described herein, facilitates enhancing the security of data stored in the EC system against cyber-attacks, facilitates a reduction of identity theft, facilitates a reduction in corporate espionage, and facilitates a reduction in the related costs and inconvenience resulting from cyber-attacks.

The example methods described herein may be conducted entirely by the electronic device 10, or partly on the computers 12, 14, 16, and 22 and partly on other electronic devices (not shown) and computer systems (not shown) operable to communicate with the electronic device 10 over the networks 16, 22. Moreover, the example methods described herein may be conducted entirely on the other computer systems (not shown) and other electronic devices (not shown). Thus, it is contemplated by the present disclosure that the example methods may be conducted on any combination of computers, computer systems (not shown), and electronic devices. Furthermore, data described herein as being stored in the memory 32 may alternatively be stored in any computer system (not shown), electronic device or Share Folder operable to communicate with any of the electronic devices in the EC system 100 over the networks 16, 22.

Additionally, the example methods described herein may be implemented with any number and organization of computer program components. Thus, the methods described herein are not limited to specific computer-executable instructions. Alternative example methods may include different computer-executable instructions or components having more or less functionality than described herein.

The example methods for enhancing the security of EC systems against security breaches described above should not be considered to imply a fixed order for performing the method steps. Rather, the method steps may be performed in any order that is practicable, including simultaneous performance of at least some steps. Moreover, the method steps may be performed in real time or in near real time. For any process described herein, there can be additional, fewer, or alternative steps performed in similar or alternative orders, or in parallel, within the scope of the various embodiments, unless otherwise stated. Furthermore, the invention is not limited to the embodiments of the methods described above in detail. Rather, other variations of the methods may be utilized within the spirit and scope of the claims.

What is claimed is:

1. A method for enhancing the security of enterprise computer systems against security breaches comprising the steps of:
- collecting, by at least one electronic device in an enterprise computer system, information about a user, the information including at least permissions to access applications in electronic devices in the enterprise computer system, permissions to access data in at least one share folder in electronic devices included in the enterprise computer system, permissions to access electronic devices in the enterprise computer system, and permissions to access data in databases in the enterprise computer system, the collected permissions being associated with the user;
- comparing the collected permissions against record permissions of the user;
- in response to determining at least one collected permission fails to match a record permission, determining a state change has occurred;
- searching items of evidence, wherein each item of evidence authorizes assignment of a permission;
- when an item of evidence is found that authorizes assignment of the non-matching permission to the user, determining the non-matching permission was authorized to be assigned to the user, otherwise determining the non-matching permission was not authorized to be assigned to the userd; and
- in response to determining that the non-matching permission was assigned to the user, validating the state change.

2. The method according to claim 1, further comprising changing the collected permissions of the user to match the record permissions of the user in response to determining the non-matching permission was not authorized to be assigned to the user.

3. The method according to claim 1, said further comprising determining whether the non-matching permission assigned administrative or remote access privileges.

4. The method according to claim 3, further comprising determining whether the user has permission to access additional electronic devices in the enterprise computer system.

5. The method according to claim 4, further comprising determining whether a firewall in the enterprise computer system permits electronic devices in the enterprise computer system to communicate with other electronic devices outside the enterprise computer system when the user has permission to access additional electronic devices in the enterprise computer system.

6. The method according to claim 5, further comprising:
investigating the enterprise security system for a security breach when the firewall permits electronic devices in the enterprise computer system to communicate with other electronic devices outside the enterprise computer system.

7. An electronic device for enhancing the security of enterprise computer systems against security breaches comprising a processor and a memory configured to store data and items of evidence, each item of evidence authorizing assignment of a permission to a record user, said electronic device being associated with a network and said memory being in communication with said processor and having instructions stored thereon which, when read and executed by said processor, cause said electronic device to:
receive information about a user, the information including at least permissions to access applications in electronic devices in the enterprise computer system, permissions to access data in at least one share folder in electronic devices included in the enterprise computer system, permissions to access electronic devices in the enterprise computer system, and permissions to access data in databases in the enterprise computer system, the collected permissions being associated with the user;
compare the received permissions against record permissions of the user;
in response to determining at least one collected permission fails to match a record permission, determine a state change has occurred;
search the items of evidence for an item of evidence that authorizes assignment of the non-matching permission to the record user;
when an item of evidence is found that authorizes assignment of the non-matching permission to the user, determine the non-matching permission was authorized to be assigned to the user, otherwise determine the non-matching permission was not authorized to be assigned to the use; and
in response to determining that the non-matching permission was assigned to the user, validate the state change.

8. The electronic device according to claim 7, wherein the instructions when read and executed by said processor, cause said electronic device to change the collected permissions of the user to match the record permissions of the user in response to determining the non-matching permission was not authorized to be assigned to the user.

9. The electronic device according to claim 7, wherein the instructions when read and executed by said processor, cause said electronic device to determine whether the non-matching permission assigned administrative or remote access privileges.

10. The electronic device according to claim 9, wherein the instructions when read and executed by said processor, cause said electronic device to determine whether the user has permission to access folders and databases in additional electronic devices in the enterprise computer system.

11. The electronic device according to claim 10, wherein the instructions when read and executed by said processor, cause said electronic device to determine whether a firewall in the enterprise computer system permits electronic devices in the enterprise computer system to communicate with other electronic devices outside the enterprise computer system when the user has permission to access additional electronic devices in the enterprise computer system.

12. The electronic device according to claim 11, wherein when the firewall permits electronic devices in the enterprise computer system to communicate with other electronic devices outside the enterprise computer system the instructions when read and executed by said processor, cause said electronic device to transmit a message to an entity responsible for managing permissions in the enterprise computer system to investigate the system for a security breach.

13. A non-transitory computer-readable recording medium in an electronic device for enhancing the security of enterprise computer systems against security breaches, the non-transitory computer-readable recording medium storing one or more programs which when executed by a hardware processor cause the non-transitory recording medium to perform steps comprising:
collecting information about a user, the information including at least permissions to access applications in electronic devices in the enterprise computer system, permissions to access data in at least one share folder in electronic devices included in the enterprise computer system, permissions to access electronic devices in the enterprise computer system, and permissions to access data in databases in the enterprise computer system, the collected permissions being associated with the user;
comparing the collected permissions against record permissions of the user;
in response to determining at least one collected permission fails to match a record permission, determining a state change has occurred;
searching items of evidence, wherein each item of evidence authorizes assignment of a permission;
when an item of evidence is found that authorizes assignment of the non-matching permission to the user, determining the non-matching permission was authorized to be assigned to the user, otherwise determining the non-matching permission was unauthorized to be assigned to the user; and
in response to determining that the non-matching permission was assigned to the user, validating the state change.

14. The non-transitory computer-readable recording medium according to claim 13, further comprising changing the collected permissions of the user to match the record permissions of the user in response to determining the non-matching permission was not authorized to be assigned to the user.

15. The non-transitory computer-readable recording medium according to claim 13, further comprising:
determining whether a firewall in the enterprise computer system permits electronic devices in the enterprise computer system to communicate with other electronic devices outside the enterprise computer system when the user has permission to access additional electronic devices in the enterprise computer system; and
investigating the enterprise security system for a security breach when the firewall permits electronic devices in the enterprise computer system to communicate with other electronic devices outside the enterprise computer system.

* * * * *